US009161069B2

(12) United States Patent
Riggs

(10) Patent No.: US 9,161,069 B2
(45) Date of Patent: Oct. 13, 2015

(54) CUSTOMIZED MODERATION OF ELECTRONIC CONTENT PUBLISHED VIA A MEDIA PORTAL

(71) Applicant: Adobe Systems Incorporated, San Jose, CA (US)

(72) Inventor: Brian Riggs, Berkeley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 58 days.

(21) Appl. No.: 13/736,444

(22) Filed: Jan. 8, 2013

(65) Prior Publication Data

US 2014/0196073 A1    Jul. 10, 2014

(51) Int. Cl.
*H04N 7/16* (2011.01)
*H04N 21/258* (2011.01)
*H04N 21/81* (2011.01)

(52) U.S. Cl.
CPC ....... *H04N 21/25875* (2013.01); *H04N 21/812* (2013.01)

(58) Field of Classification Search
USPC ..................................... 725/27, 93
See application file for complete search history.

(56) References Cited

U.S. PATENT DOCUMENTS

2014/0095324 A1* 4/2014 Cabral et al. ............... 705/14.71

* cited by examiner

*Primary Examiner* — Jivka Rabovianski
(74) *Attorney, Agent, or Firm* — Kilpatrick Townsend & Stockton LLP

(57) ABSTRACT

Systems and methods are provided for providing customized moderation of electronic content published via a media portal. The content management application can access a feed that includes multiple electronic content items. The content management application can determine, based on an approval descriptor associated with the feed, that additional content provided to the feed is provided by a publisher account that must be approved by a moderator account rather than an additional publisher account for which other additional content is automatically approved without requiring moderator approval. The content management application can require approval of the additional content by the moderator account. The moderator account has permission to moderate electronic content provided to the feed based on a moderator descriptor associated with the feed.

17 Claims, 3 Drawing Sheets

CUSTOMIZED MODERATION OF ELECTRONIC CONTENT PUBLISHED VIA A MEDIA PORTAL

TECHNICAL FIELD

This disclosure relates generally to computer-implemented methods and systems and more particularly relates to providing customized moderation of electronic content published via a media portal or other publishing system in which different entities can publish or moderate content.

BACKGROUND

Content providers, such as providers of cable television programs or videos provided via the Internet, may utilize a video publishing system. The video publishing system publishes content from the content providers to a media portal, such as by providing episodic content over the Internet. The video publishing system can also insert advertisement content from third parties into content provided by the content provider.

A content provider may be responsible for multiple feeds of electronic content, such as different television shows. The content provider may employ multiple entities responsible for publishing the content via the media portal. The content provider may also employ multiple entities responsible for moderating the content published via the media portal. Moderator entities can ensure that content does not include objectionable material, complies with copyright laws, has an acceptable level quality, or complies with other criteria for publishing content via the media portal.

Prior solutions for managing moderation of media content published to a media portal involve global access control. For example, a global access control policy can allow an episode of electronic content by any entity or can bar an episode of electronic content by any entity. Such solutions fail to provide flexible access control customized to specific entities or specific groups or entities.

SUMMARY

One embodiment involves accessing a feed that includes multiple electronic content items. The embodiment also involves determining, based on an approval descriptor associated with the feed, that additional content provided to the feed is provided by a publisher account that must be approved by a moderator account rather than an additional publisher account for which other additional content is automatically approved without requiring moderator approval. The embodiment also involves requiring approval of the additional content by the moderator account. The moderator account has permission to moderate electronic content provided to the feed based on a moderator descriptor associated with the feed.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings, where.

DETAILED DESCRIPTION

Figure 1:
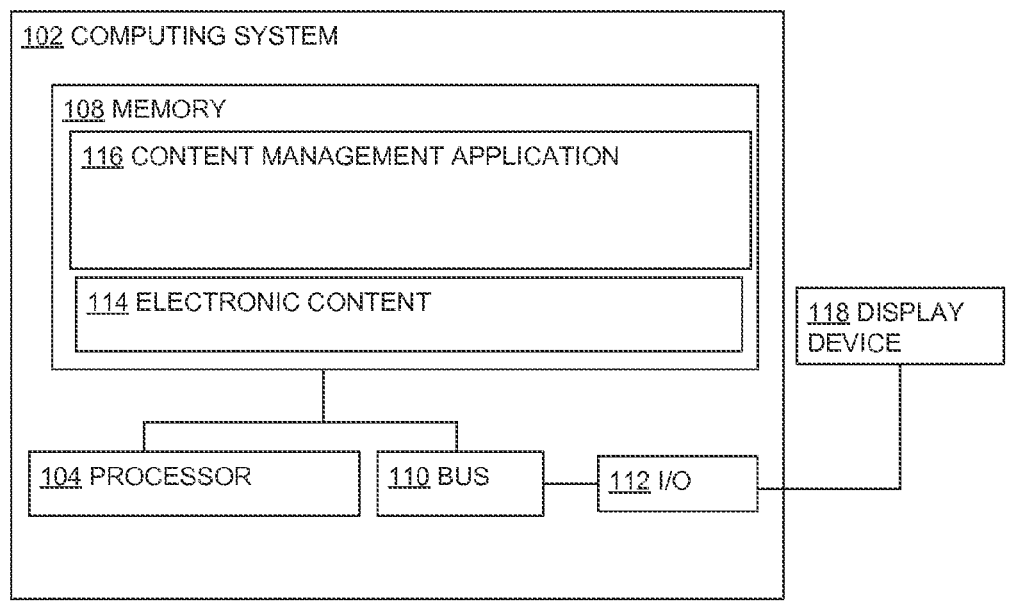
FIG. 1 is a block diagram depicting example computing systems for implementing certain embodiments.

Computer-implemented systems and methods are disclosed for providing customized moderation of electronic content published via a media portal or other publishing system in which different entities can publish or moderate content.

The following non-limiting example is provided to help introduce the general subject matter of certain embodiments. A content management application can manage electronic content to be provided via a web portal, such as a website hosting videos uploaded by different entities. The content management application can be used to generate policies for managing electronic content via a media publishing protocol. The media publishing protocol can categorize electronic content as feeds and entries. For example, the content management application can specify feeds corresponding to channels of multimedia content via the media publishing protocol and specify entries corresponding to episodes of multimedia content via the media publishing protocol. A feed may be a channel on a web portal entitled "The Patent Drafting Show." The feed may include entries that may include weekly published episodes titled "Novel Claims" and "Non-Obvious Claims." A group of access descriptors can be specified for the channel "The Patent Drafting Show" via a feed extension or other suitable file. The feed extension describes which entities can access the channel, which entities can publish electronic content to the channel, and which entities can moderate access to the channel. The feed extension can also specify whether electronic content published to the channel is automatically approved. For example, the feed extension can specify that electronic content published to the channel is automatically made public to a set of viewers specified by the first feed extension. For example, a feed extension for "The Patent Drafting Show" may specify that additional content is to be automatically approved for publication. Thus, an additional episode titled "Allowance" can be automatically made available with "The Patent Drafting Show." The feed extension can also specify that electronic content published to the channel is not automatically made public. The content management application can prevent the electronic content from being made public until a moderator entity performs some operation approving the electronic content for publication.

The content management application can enforce moderation rules whenever any entity attempts to publish content via a channel. An electronic content item can be "published" by allowing access to the content via a media portal for clients having permission to access the feed. The content management application can also modify moderation rules for a channel and/or be used to generate different moderation rules for different channels. In one example, an administrator of a video publishing system or other electronic content publishing system may approve all uploaded videos before the videos are displayed to all entities of the system. In another example, some channels of a video publishing system or other electronic content publishing system may include content that is automatically published and other channels may require a moderator entity to approve content before publication of the content. The approval descriptor can include a Boolean value or other value indicating whether content should be automatically approved or whether a moderator entity would need to approve the content prior to the content being made accessible to viewer entities.

In accordance with one embodiment, a content management application is used to specify and/or apply moderation rules for channels or other feeds of electronic content. Systems and methods are provided for providing customized moderation of electronic content published via a media portal. The content management application can access a feed that includes multiple electronic content items. The content management application can determine, based on an approval descriptor associated with the feed, that additional content provided to the feed is provided by a publisher account that must be approved by a moderator account rather than an additional publisher account for which other additional content is automatically approved without requiring moderator approval. The content management application can require approval of the additional content by the moderator account. The moderator account has permission to moderate electronic content provided to the feed based on a moderator descriptor associated with the feed.

As used herein, the term "electronic content" is used to refer to any type of media that can be rendered for display or use at a computing system or other electronic device. Electronic content can include text or multimedia files, such as images, video, audio, or any combination thereof. A computing system or other electronic device may access electronic content via a media portal.

As used herein, the term "client account" is used to refer to an identifier or other descriptor for an entity, such as an individual or a group of individuals. A client account can also include one or more authentication credentials, such as a password, personal identification number, a security question and an associated answer, etc. A client account can be associated with or provided by a network service, such as (but not limited to) a social media service or a cloud service.

As used herein, the term "feed" is used to refer to a collection of related electronic content items identified as entries of the feed. Each entry of a feed can include an extensible set of attached or otherwise associated metadata. For example, the extensible metadata can include a title, a description and other metadata describing the entry. Non-limiting examples of a feed include a channel of an online video portal that includes a collection of related video content or a weblog that includes a collection of textual content.

As used herein, the term "media portal" is used to refer to an application or a group of applications that can provide access to electronic content to viewer entities via a data network. Non-limiting examples of electronic content published via a media portal can include textual electronic content (e.g., blogs) or video electronic content published via the Internet. In some embodiments, a media portal can provide access to any form of electronic content. In other embodiments, a media portal can provide access to specific forms of electronic content, such as a website providing only blog entries or a website providing only audio podcasts.

As used herein, the term "media publishing protocol" is used to refer to standards and processes for uploading and managing feeds of electronic content published via a media portal. Standards and processes for uploading and managing episodic electronic content can be defined using any suitable method. For example, a media publishing protocol may define standards and processes via extensible markup language ("XML") files. A non-limiting example of a media publishing protocol for publishing electronic content via a media portal is the Atom Publishing Protocol. The Atom Publishing Protocol is a simple HTTP-based protocol for creating and updating web resources. The Atom Publishing Protocol is used to generate XML documents that describe lists of feeds. The Atom Publishing Protocol can be used for publishing web content such as weblogs and news headlines to web sites.

As used herein, the term "automatically approve" is used to refer to designating that electronic content provided by a publisher entity to a feed is accessible to viewer entities for the feed without an additional approval operation performed by a moderator entity. For example, an automatically approved electronic content item can be accessible to viewer entities of a feed immediately upon being published to the feed.

In some embodiments, the descriptors can include feed extensions or other metadata that is associated with a given channel. An extension may be defined in an XML document by reference to a feed corresponding to a channel. The content management application can generate customized feed extensions allowing for customized moderation of electronic content. The feed extensions can specify which entities have the right to perform certain operations with respect to a channel. The feed extensions can also specify which content items are automatically approved and which content items are to be approved by a moderator entity prior to publication via the media portal. Feed extensions can be defined via the media publishing protocol. The feed extension can include, for example, a comma-separated list of entities or groups of entities.

As used herein, the term "metadata" is used to refer to information associated with (and generally but not necessarily stored with) an electronic content item that describes a feature of the electronic content item. Metadata may describe a location or identification of electronic content. Non-limiting examples of metadata for an electronic content item can include a title, author, keywords, and the like. Metadata may also describe a relationship between a first electronic content item and a second electronic content item, such as how the first and second electronic content items can be combined and sequenced for a multimedia presentation. Metadata can also describe when and how an electronic content item was created, a file type and other technical information for the electronic content item, and/or access rights for the electronic content item. In some embodiments, metadata includes data included in the electronic content item that is not displayed by a client application using the electronic content item.

The approval descriptor specifying whether content is automatically approved can be modified via any suitable process or mechanism. In some embodiments, the value of the approval descriptor can be modified manually via a client account of a media portal. In other embodiments, the content management application can automatically modify the value of the approval descriptor based on any suitable criteria. For example, the content management application can automatically modify the value of the approval descriptor based on the visibility of a feed managed via the approval descriptor. Determining whether to automatically approve electronic content based on the visibility of the feed can allow a moderator entity to prioritize moderation of channels having content with high visibility and allow non-moderated electronic content to be published to channels having content with low visibility. For example, a media channel may not have a large number of viewers, thereby decreasing the potential for negative feedback resulting from low quality and/or inappropriate electronic content.

As used herein, the term "visibility" is used to refer to how frequently or prominently a channel or other feed of electronic content is displayed or otherwise featured in a media portal or accessed by viewer entities via the media portal. In one example, a highly visible channel may be a channel that is displayed on the home page for a portal such as a web site or provided as a list of suggested electronic content in each page of a web site. In another example, a highly visible channel may be a channel that is most frequently accessed within a predetermined period.

In some embodiments, the approval descriptor may identify whether the feed or a link to the feed is featured prominently in a media portal. In one example, the content management application may automatically modify a value for an approval descriptor to allow automatic approval based on determining that the feed is included in a list of recommended content provided by the media portal. A list of recommended content can be, for example, a listing of the most frequently viewed or most highly rated feeds. In another example, the content management application may automatically modify a value for an approval descriptor to allow automatic approval based on determining that the feed is accessible via an interface displayed upon a viewer entity initially accessing a portal. For example, the approval descriptor may be set to bar automatic approval based on determining that the feed is accessible via the home page of a video publishing website.

In another example, the content management application may automatically modify a value for an approval descriptor to allow or bar automatic approval based on metrics associated with the feed. The content management application can monitor such metrics over a period of time or access such metrics provided by a different application or software module. Metrics associated with a given feed can include, for example, a number of views of feed content over a given amount of time, a number of links to the feed from different web sites, an amount of revenue generated by viewing entities accessing the feed or advertisers including content in the feed, and the like. The content management application may automatically modify the approval descriptor to prevent automatic approval based on the metrics exceeding a predetermined threshold.

The content management application can also provide a function for a moderator entity to subsequently remove the electronic content from publication. For example, a moderator entity may subsequently determine that an automatically published episode fails to meet standards of quality and/or appropriateness, such as an episode of "The Patent Drafting Show" having a poor viewing resolution or electronic content deemed to be offensive (e.g., an episode entitled "Rejecting Claims"). The moderator entity may remove the automatically published episode from publication.

A content management application as described herein can provide flexibility with respect to moderation of different channels or other feeds of electronic content. Feed extensions can be generated on a per-channel basis such that different sets of entities can moderate different channels. The content management application can be implemented for use via any suitable media publishing protocol for moderating feeds of electronic content. For example, using the Atom Publishing Protocol to generate customized feed extensions can leverage existing Atom libraries to provide simple, robust, and powerful solutions.

Referring now to the drawings, FIG. 1 is a block diagram depicting an example computing system 102 for implementing certain embodiments.

The computing system 102 includes a processor 104 that is communicatively coupled to a memory 108 and that executes computer-executable program instructions and/or accesses information stored in the memory 108. The processor 104 may comprise a microprocessor, an application-specific integrated circuit ("ASIC"), a state machine, or other processor. The processor 104 can include any of a number of computer processing devices, including one. Such a processor can include or may be in communication with a computer-readable medium storing instructions that, when executed by the processor 104, cause the processor to perform the steps described herein.

The computing system 102 may also comprise a number of external or internal devices such as input or output devices. For example, the computing system 102 is shown with an input/output ("I/O") interfaces 112 and display device 118. A bus 110 can also be included in the computing system 102. The bus 110 can communicatively couple one or more components of the computing system 102.

The computing system 102 can modify, access, or otherwise use electronic content 114. The electronic content 114 may be resident in any suitable computer-readable medium and execute on any suitable processor. In one embodiment, the electronic content 114 can reside in the memory 108 at the computing system 102. In another embodiment, the electronic content 114 can be accessed by the computing system 102 from a server system via a data network.

A content management application 116 stored in the memory 108 can configure the processor 104 to access, modify, or otherwise use the electronic content 114. In some embodiments, the content management application 116 can be a software module included in or accessible by a separate application executed by the processor 104 that is configured to modify, access, or otherwise use the electronic content 114. In other embodiments, the content management application 116 can be a stand-alone application executed by the processor 104.

A computer-readable medium may include, but is not limited to, electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The computing system 102 can include any suitable device for executing the content management application 116. Non-limiting examples of a computing device include a desktop computer, a server system, a tablet computer, or any other computing systems suitable for managing electronic content.

Figure 2:
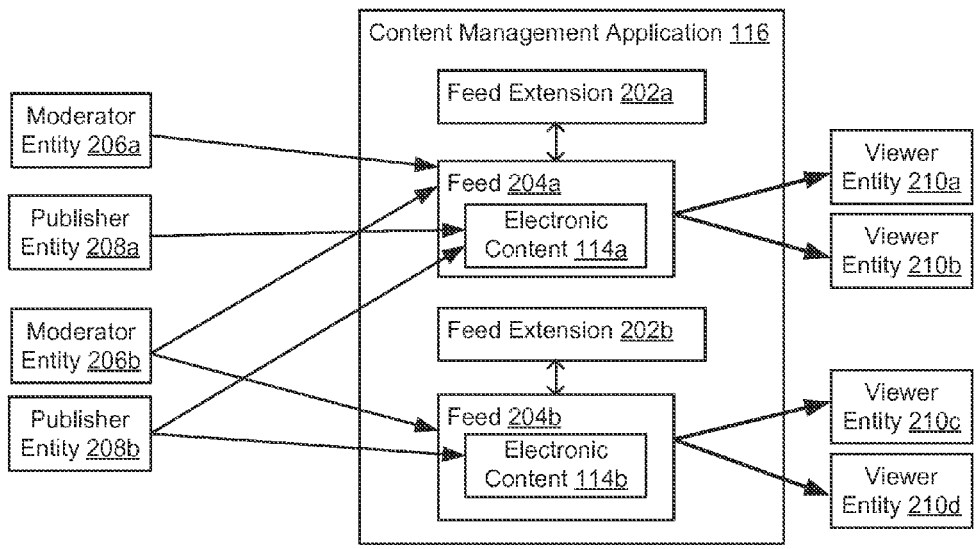
FIG. 2 is a modeling diagram illustrating an example flow of communications among a content management application managing feeds and moderator entities publisher entities and viewer entities.

FIG. 2 is a modeling diagram illustrating a flow of communications among a content management application 116 managing feeds 204a, 204b and moderator entities 206a, 206b, publisher entities 208a, 208b, and viewer entities 210a-d.

The feeds 204a, 204b can respectively include electronic content 114a, 114b. Each of electronic content 114a, 114b include related collections of content items. For example, the feeds 204a, 204b can be channels provided by a media portal such as video publication website. Electronic content 114a, 114b can include video content provided via each respective channel of the video publication website.

The feed 204a is associated with the moderator entities 206a, 206b, the publisher entities 208a, 208b, and the viewer entities 210a, 210b. Each of the publisher entities 208a, 208b can upload, modify, or otherwise provide content items to the electronic content 114a of the feed 204a. Each of the moderator entities 206a, 206b can moderate content items of the electronic content 114a provided by the publisher entities 208a, 208b. Each of the viewer entities 210a, 210b can view or otherwise access the electronic content 114a published to the feed 204a.

The feed 204b is associated with the moderator entity 206b, the publisher entity 208b, and the viewer entities 210c, 210d. The publisher entity 208b can upload, modify, or otherwise provide content items to the electronic content 114b of the feed 204b. The moderator entity 206b can moderate content items of the electronic content 114b provided by the publisher entity 208b. Each of the viewer entities 210c, 210d can view or otherwise access the electronic content 114b published to the feed 204b.

Each of the feeds 204a, 204b is associated with a respective feed extension 202a, 202b. The feed extensions 202a, 202b describe which entities can access the channel, which entities can publish electronic content to the channel, and which entities can moderate access to the feed. The feed extensions 202a, 202b can specify viewer entities that are authorized to access the feed. Entities not specified by a feed extension for a feed are barred from accessing the feed. The feed extensions 202a, 202b can also specify publisher entities that are authorized to provide electronic content to the feed. Entities not specified by a feed extension for a feed are barred from publishing electronic content to the feed. The feed extensions 202a, 202b can also specify moderator entities that are authorized to moderate electronic content provided to the feed. Entities not specified by a feed extension for a feed are barred from moderating electronic content published to the feed. Moderating content can include determining whether electronic content provided to the feed is available for access by viewer entities.

Figure 3:
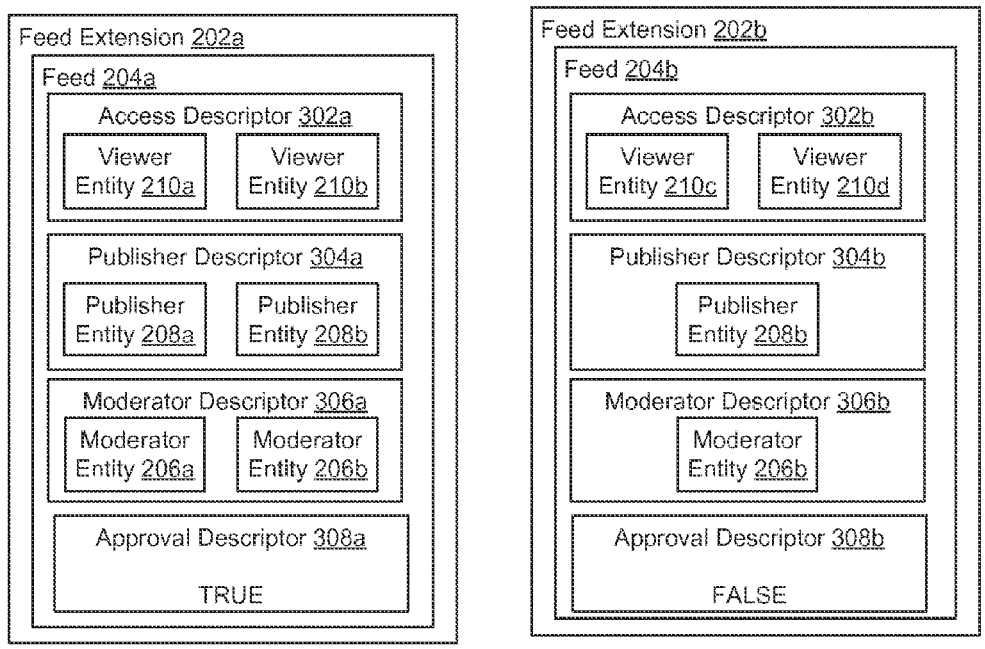
FIG. 3 is a modeling diagram illustrating example feed extensions for feeds managed by a content management application.

FIG. 3 is a modeling diagram illustrating example feed extensions 202a, 202b for feeds 204a, 204b managed by the content management application 116. The feed extensions 202a, 202b can respectively include access descriptors 302a, 302b, publisher descriptors 304a, 304b, moderator descriptors 306a, 306b, and approval descriptors 308a, 308b.

The access descriptors 302a, 302b can identify client accounts associated with entities having permission to access the respective feeds 204a, 204b. For example, as depicted in FIG. 3, the access descriptor 302a identifies the viewer entities 210a, 210b as having permission to access the feed 204a. The access descriptor 302b identifies the viewer entities 210c, 210d as having permission to access the feed 204b. The viewer entities 210a-d may have "read only" access to the feeds 204a, 204b.

The publisher descriptors 304a, 304b can identify client accounts associated with entities having permission to provide electronic content items to the respective feeds 204a, 204b. For example, as depicted in FIG. 3, the publisher descriptor 304a identifies the publisher entities 208a, 208b as having permission to provide content to the feed 204a. The publisher descriptor 304b identifies the publisher entity 208b as having permission to provide content to the feed 204b.

The moderator descriptors 306a, 306b can identify client accounts associated with entities having permission to moderate electronic content items provided to the respective feeds 204a, 204b. For example, as depicted in FIG. 3, the moderator descriptor 306a identifies the moderator entities 206a, 206b as having permission to moderate content provided to the feed 204a. The moderator descriptor 306b identifies the moderator entity 206b as having permission to moderate content provided to the feed 204b.

The approval descriptors 308a, 308b can specify whether electronic content published to the respective feeds 204a, 204b is to be automatically approved. In some embodiments, an approval descriptor can include a Boolean value indicating whether content should be automatically approved or whether a moderator entity would need to approve the content prior to the content being made accessible to viewer entities. For example, the approval descriptor 308a depicted in FIG. 3 has a value of "TRUE." Electronic content published to the feed 204a is automatically approved or otherwise made available to the set of viewer entities specified by the access descriptor 302a. The approval descriptor 308b depicted in FIG. 3 has a value of "FALSE." Electronic content published to the feed 204a is not automatically approved or otherwise made available to the set of viewer entities specified by the access descriptor 302b. The content management application 116 can thus prevent the electronic content 114b from being made public to the viewer entities specified by the access descriptor 302b without the moderator entity 206b performing an operation for approving the electronic content 114b.

In additional or alternative embodiments, the content management application 116 can determine whether electronic content provided to a feed is to be automatically approved based on the visibility of the feed. Determining whether to automatically approve electronic content based on the visibility of the feed can allow a moderator entity to prioritize moderation of channels having content with high visibility and allow non-moderated electronic content to be published to channels having content with low visibility.

In some embodiments, the approval descriptor may identify whether the feed or a link to the feed is featured prominently in a media portal. In one example, the content management application 116 may automatically modify a Boolean value for an approval descriptor to be "FALSE" (i.e., prevent automatic approval) based on determining that the feed is included in a list of recommended content provided by the media portal, such as a listing of the most frequently viewed or most highly rated feeds. In another example, the content management application 116 may automatically modify a Boolean value for an approval descriptor to be "FALSE" based on determining that the feed or a link to the feed is provided in the interface displayed upon a viewer entity initially accessing a portal, such as the home page of a video publishing website.

In another example, the content management application 116 may monitor metrics associated with different feeds. Such metrics can include, for example, a number of views of content in the feed over a given amount of time, a number of links to the feed from different web sites, an amount of revenue generated by viewing entities accessing the feed or advertisers including content in the feed, and the like. The content management application 116 may automatically modify a Boolean value or other representative of an approval descriptor based on metrics associated with the feed, such as setting the Boolean value to "FALSE" (i.e. preventing automatic content approval) based on the metrics exceeding a predetermined threshold (i.e., determining that the feed is highly visible).

In some embodiments, the content management application 116 can prevent an approval descriptor from being created based on the moderator descriptor being absent or otherwise not identifying any moderator entities. In other embodiments, the content management application 116 can ignore any value for an approval descriptor based on the moderator descriptor being absent or otherwise not identifying any moderator entities.

The content management application 116 can generate, modify, or otherwise use the feed extensions 202a, 202b via any suitable media publishing protocol. A suitable media publishing protocol can include "create", "read", and "update" operations. The "read" operation can include, for example, accessing a channel or other feeds specified by XML documents to identify the feed extensions or other descriptors included in the XML document. The "create" operation can include generating new feed extensions or other descriptors for a channel or other feed. The "update" operation can include modifying extensions or other descriptors for an existing channel or other feed. For example, the content management application 116 can modify a value for an access descriptor from "TRUE" to "FALSE".

In a non-limiting example, feed extensions or other descriptors may be created via the Atom Publishing Protocol. The content management application can define feed extensions within the "etv" namespace of the Atom Publishing Protocol. The feed extensions can be specified at the feed (i.e. channel) level. A feed extension can include descriptors such as "<etv:viewers/>", "<etv:publishers/>", "<etv:moderators>", and "<etv:autoApprove>". The "<etv:viewers>" descriptor can include a comma-separated list of entities or groups associated with permissions to access electronic content via the channel. When unspecified, all viewer entities may access content provided via a channel. The "<etv:publishers>" descriptor can include a comma-separated list of entities or groups that have permission to provide content to the channel. When unspecified, only a creating entity can publish content into the channel. The "<etv:moderators>" descriptor can include a comma-separated list of entities or groups who are allowed to moderate content uploaded into the channel. When unspecified, the channel can be un-moderated such that all uploaded content is be immediately made available to viewer entities. The "<etv:autoApprove>" descriptor can include a Boolean indicating whether content should be automatically approved or whether a moderator entity would need to approve the content prior to the content being made accessible to viewer entities. If the "<etv:autoApprove>" descriptor has a value of "TRUE," content provided by a publisher entity is automatically made available to viewer entities. A moderator entity may subsequently bar the automatically approved content or otherwise make the automatically approved content unavailable to viewer entities.

The feed extensions 202a, 202b can allow the content management application 116 to require approval of a moderator entity for the feed 204b and provide an auto-approval feature for the feed 204a. The feed extensions 202a, 202b can allow a moderator application to do so on a per-channel basis for a wide variety of entity groupings. For example, to create a channel where all episodes must be approved by entity "jsnuffy", an Atom entry can be posted to a channel's Atom endpoint. The Atom entry can include the following: "<etv:moderators>jsnuffy</etv:moderators> <etv:autoApprove>false</etv:autoApprove>." Upon receiving a request for a feed that includes this entry, access control lists can be defined for the channel such that the appropriate entities would have read/write authority. For example, when an episode of the channel is not yet approved, only the creating entity and the moderator would have read access to the episode. After the moderator approves the episode, all entities in the system would have read access to the episode.

In additional or alternative embodiments, a content management application 116 can be used to change the moderation rules for a channel and to provide different moderation rules for different channels. In one example, a highly visible channel on the front page of the video portal (e.g., "Top Videos of the Week") may require strict moderation. To provide strict moderation, an approval descriptor for the highly visible channel can be set to "FALSE." In another example, for a less visible channel, the approval descriptor can be set to "TRUE," thereby allowing automatic approval of uploaded content and reducing the time required for content to appear on the media portal.

The content management application 116 can also provide flexibility for access rights between channels by customizing feed extensions 202a, 202b to each channel. For example, an electronic content provider may provide multiple channels of episodic electronic content. The content management application 116 may specify one or more feed extensions for each channel. The feed extensions for each channel are configurable to specify publishers, moderators, and an auto-approve feature specific to the respective channel.

The content management application 116 can also provide flexibility for access rights between different sets of publisher entities. Multiple publisher entities may be specified for electronic content of a channel. The content management application 116 may specify one or more feed extensions 202a, 202b for each publisher. The feed extensions 202a, 202b are configurable to specify, for a given publisher, one or more moderators specific to the publisher and whether an auto approve feature specific to the publisher is enabled.

For example, a feed extension may specify the publisher entities Manager and Associate. The feed extension may further specify the moderator entities Owner and Senior Associate. The feed extension may further specify that the moderator entity Owner can moderate electronic content published by the publisher entity Manager and that the moderator entity Senior Associate can moderate electronic content published by the publisher entity Associate. The feed extension may further specify that the electronic content published by the publisher entity Manager is automatically approved and that the electronic content published by the publisher entity Associate must be approved by the moderator entity Senior Associate prior to publication.

Figure 4:
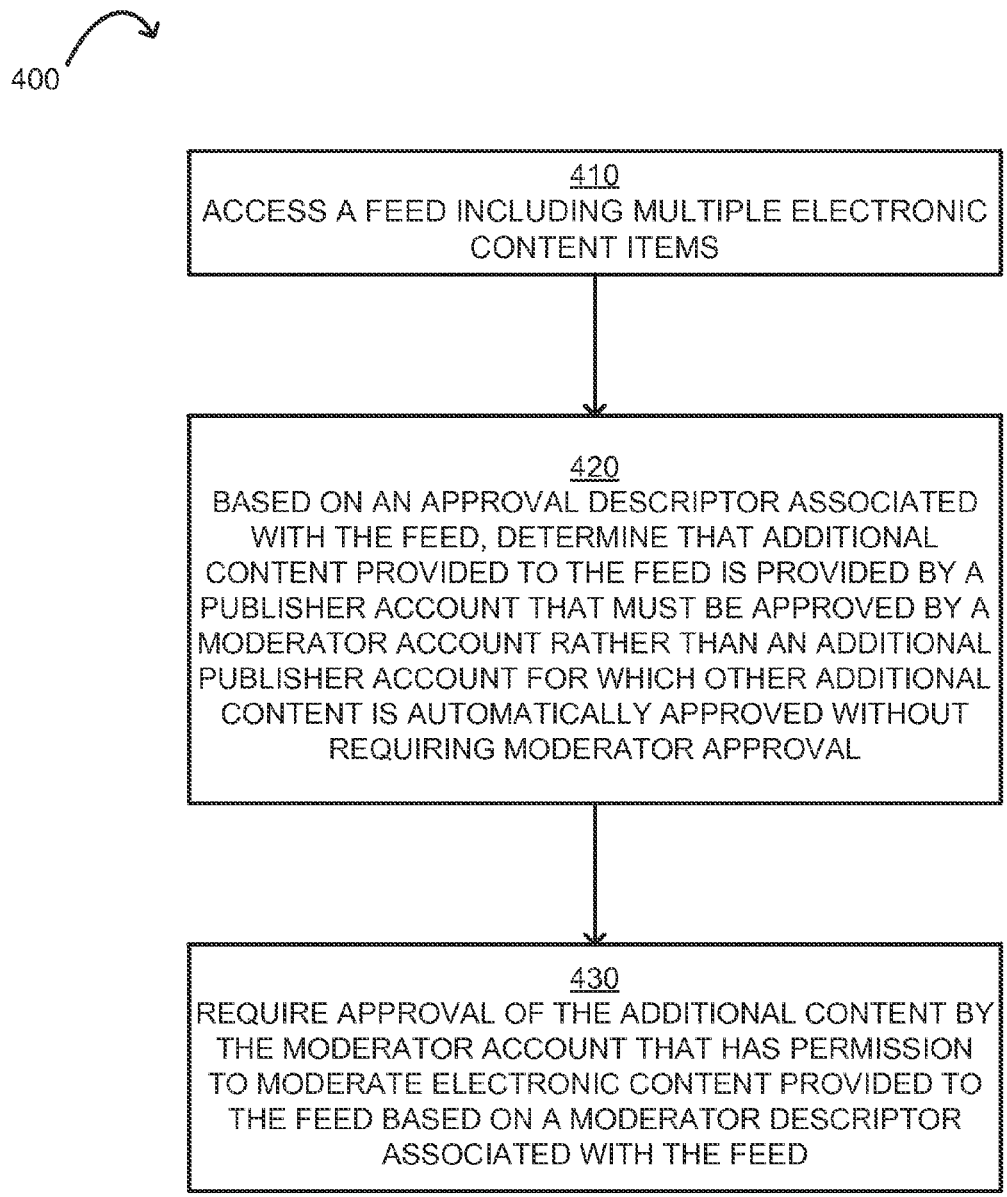
FIG. 4 is a flow chart illustrating an example method for providing customized moderation of electronic content published via a media portal or other publishing system in which different entities can publish or moderate content.

FIG. 4 is a flow chart illustrating an example method 400 for providing customized moderation of electronic content published via a media portal or other publishing system in which different entities can publish or moderate content. For illustrative purposes, the method 400 is described with reference to the system implementation depicted in FIG. 1. Other implementations, however, are possible.

The method 400 involves accessing a feed including multiple electronic content items, as shown in block 410. The processor 104 of the computing system 102 can execute the content management application 116 to access a feed from the memory 108 or, additionally or alternatively, a remote location accessible via a data network.

The method 400 further involves determining, based on an approval descriptor associated with the feed, that additional content provided to the feed is provided by a publisher account that must be approved by a moderator account rather than an additional publisher account for which other additional content is automatically approved without requiring moderator approval, as shown in block 420. The processor 104 can execute the content management application 116 to identify the publisher client accounts having permission to provide additional electronic content to the feed and the moderator accounts having permission to moderate electronic content provided to the feed, as described above with respect to FIGS. 2-3.

In some embodiments, the same entity or at least some of the same entities may be identified as moderator entities by a moderator descriptor and identified as publisher entities by a publisher descriptor. In other embodiments, a publisher descriptor may identify a set of publisher entities that is completely different from a set of moderator entities.

The method 400 further involves requiring approval of the additional content by the moderator account that has permission to moderate electronic content provided to the feed based on a moderator descriptor associated with the feed, as shown in block 430. The processor 104 can execute the content management application 116 to require approval of the additional content. In some embodiments, the content management application 116 can generate notifications for one or more moderator entities based on the additional content has being received.

In additional or alternative embodiments, the content management application 116 can generate a notification for one or more moderator entities based on content being automatically approved for publication to a channel or other feed. A moderator entity can subsequently revoke access to automatically approved content. The content management application can provide a notification to a publisher entity of the electronic content stating that the electronic content has been rejected by the moderator. The notification can also include reasons for the rejection, such as the electronic content including copyrighted electronic content, the electronic content being deemed offensive, etc. The publisher entity can subsequently decide whether to go modify the electronic content to comply with contend standards and re-publish the electronic content.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method comprising:
accessing, by a processing device, a first feed comprising a first plurality of electronic content items and a second feed comprising a second plurality of electronic content items;
determining, by the processing device, a visibility of the first feed in a media portal via which at least one of the first plurality of electronic content items are accessible, wherein the visibility comprises at least one of (i) a frequency with which the first feed is accessed via the media portal and (ii) a prominence with which the first feed is featured in the media portal;
modifying, by the processing device, a first approval descriptor associated with the first feed based on the visibility of the first feed;
determining, by the processing device, based on the first approval descriptor as modified using the visibility, that additional first content provided to the first feed from a publisher account must be approved by a moderator account, wherein additional second content provided to the second feed by the publisher account is automatically approved by the processing device without requiring moderator approval based on a second approval descriptor associated with the second feed; and
generating, by the processing device, an electronic notification signal indicating that publication of the additional first content to the first feed requires approval by the moderator account, wherein the processing device generates the electronic notification signal based on determining that the first feed requires approval by the moderator account and further based on determining that the moderator account has permission to moderate electronic content provided to the first feed based on a moderator descriptor associated with the first feed.

2. The method of claim 1, wherein determining the visibility of the first feed comprises:
identifying at least one metric associated with the first feed, wherein the at least one metric describes the frequency with which the first feed is accessed; and determining that the at least one metric exceeds a threshold metric value.

3. The method of claim 1, wherein determining the visibility of the first feed comprises determining that the first feed is accessible via an interface initially provided when accessing the media portal.

4. The method of claim 1, wherein the moderator account specified by the moderator descriptor is different from the publisher account specified by a publisher descriptor.

5. The method of claim 1, wherein the moderator account specified by the moderator descriptor is identical to the publisher account specified by a publisher descriptor.

6. The method of claim 1, wherein each of a publisher descriptor identifying the publisher account and the moderator descriptor comprise at least one of a list of entities corresponding to client accounts or a list of groups of entities corresponding to client accounts.

7. The method of claim 1, further comprising generating, by the processing device, at least one of the first approval descriptor, the moderator descriptor, or a publisher descriptor identifying the publisher account based on a media publishing protocol governing publication of the first plurality of electronic content items via a media portal.

8. The method of claim 1, further comprising performing, by the processing device, operations comprising:
 determining that the first feed has been accessed more frequently via a website during a period of time than the second feed has been accessed via the website during the period of time;
 modifying the first approval descriptor for the first feed to require approval of content for publication by the moderator account based on determining that the first feed has been accessed more frequently.

9. A non-transitory computer-readable medium embodying program code executable by a processing device, the non-transitory computer-readable medium comprising:
 program code for configuring the processing device to access a first feed comprising a first plurality of electronic content items and a second feed comprising a second plurality of electronic content items;
 program code for configuring the processing device to determine a visibility of the first feed in a media portal via which at least one of the first plurality of electronic content items are accessible;
 program code for configuring the processing device to modify a first approval descriptor associated with the first feed based on the visibility of the first feed, wherein the visibility comprises at least one of (i) a frequency with which the first feed is accessed via the media portal and (ii) a prominence with which the first feed is featured in the media portal;
 program code for configuring the processing device to determine, based on the first approval descriptor as modified using the visibility, that additional first content provided to the first feed from a publisher account must be approved by a moderator account, wherein additional second content provided to the second feed by the publisher account is automatically approved by the processing device without requiring moderator approval based on a second approval descriptor associated with the second feed; and
 program code for configuring the processing device to generate an electronic notification signal indicating that publication of the additional first content to the first feed requires approval by the moderator account, wherein the electronic notification signal is generated based on determining that the first feed requires approval by the moderator account and further based on determining that the moderator account has permission to moderate electronic content provided to the first feed based on a moderator descriptor associated with the first feed.

10. The non-transitory computer-readable medium of claim 9, wherein determining the visibility of the first feed comprises:
 identifying at least one metric associated with the first feed, wherein the at least one metric describes the frequency with which the first feed is accessed; and
 determining that the at least one metric exceeds a threshold metric value.

11. The non-transitory computer-readable medium of claim 9, wherein determining the visibility of the first feed comprises determining that the first feed is accessible via an interface initially provided when accessing the media portal.

12. The non-transitory computer-readable medium of claim 9, wherein the moderator account specified by the moderator descriptor is different from the publisher account specified by a publisher descriptor.

13. The non-transitory computer-readable medium of claim 9, wherein the moderator account specified by the moderator descriptor is identical to the publisher account specified by a publisher descriptor.

14. The non-transitory computer-readable medium of claim 9, wherein each of a publisher descriptor identifying the publisher account and the moderator descriptor comprise at least one of a list of entities corresponding to client accounts or a list of groups of entities corresponding to client accounts.

15. The non-transitory computer-readable medium of claim 9, further comprising program code for configuring the processing device to generate at least one of the first approval descriptor, the moderator descriptor, or a publisher descriptor identifying the publisher account based on a media publishing protocol governing publication of the first plurality of electronic content items via a media portal.

16. A system comprising:
 a processor configured to execute instructions stored in a non-transitory computer-readable medium;
 wherein the instructions comprise a content management application configured to perform operations comprising:
 accessing a first feed comprising a first plurality of electronic content items and a second feed comprising a second plurality of electronic content items,
 determining a visibility of the first feed in a media portal via which at least one of the first plurality of electronic content items are accessible, wherein the visibility comprises at least one of (i) a frequency with which the first feed is accessed via the media portal and (ii) a prominence with which the first feed is featured in the media portal,
 modifying a first approval descriptor associated with the first feed based on the visibility of the first feed,
 determining, based on the first approval descriptor as modified using the visibility, that additional first content provided to the first feed from a publisher account must be approved by a moderator account, wherein additional second content provided to the second feed by the publisher account is automatically approved without requiring moderator approval based on a second approval descriptor associated with the second feed, and
 generating an electronic notification signal indicating that publication of the additional first content to the first feed requires approval by the moderator account, wherein the electronic notification signal is generated based on determining that the first feed requires approval by the moderator account and further based on determining that the moderator account has permission to moderate electronic content provided to the first feed based on a moderator descriptor associated with the first feed.

17. A method for controlling a volume of electronic communication via a data network, the method comprising:

receiving, by a processing device via a data network, a plurality of electronic communications generated by accessing a feed via a media portal;

determining, by the processing device, a frequency with which the feed is accessed, wherein the processing device determines the frequency based on the plurality of electronic communications being received and a time period in which the plurality of electronic communications were received;

modifying, by the processing device, electronic data comprising a rule used for approving content for publication to the feed, wherein the processing device modifies the electronic data based on determining that the frequency is above a threshold frequency;

receiving, by the processing device, an electronic content item from a first computing device subsequent to modifying the electronic data comprising the rule;

determining, by the processing device based on the modified rule, whether an electronic communication that indicates approval of an electronic content item and that is associated with a moderator account must be received by the processing device from a second computing device prior to providing electronic access via the data network to the electronic content item within the feed; and performing, by the processing device, at least one of:
based on determining that the electronic communication indicating the approval must be received, generating an electronic notification signal addressed to the moderator account and providing the electronic access to the electronic content item with the feed via the media portal after generating the electronic notification signal and receiving the electronic communication indicating the approval; or based on determining that the electronic communication indicating the approval must be received, providing the electronic access to the electronic content item with the feed via the media portal without receiving the electronic communication indicating the approval.

* * * * *